United States Patent
Selevan

(10) Patent No.: US 10,922,987 B2
(45) Date of Patent: Feb. 16, 2021

(54) SEQUENCED GUIDING SYSTEMS FOR VEHICLES AND PEDESTRIANS

(71) Applicant: James R. Selevan, Laguna Beach, CA (US)

(72) Inventor: James R. Selevan, Laguna Beach, CA (US)

( * ) Notice: Subject to any disclaimer, the term of this patent is extended or adjusted under 35 U.S.C. 154(b) by 0 days.

(21) Appl. No.: 16/522,282

(22) Filed: Jul. 25, 2019

(65) Prior Publication Data

US 2020/0090533 A1 Mar. 19, 2020

Related U.S. Application Data

(63) Continuation of application No. 15/847,235, filed on Dec. 19, 2017, now abandoned, which is a (Continued)

(51) Int. Cl.
| | |
|---|---|
| *G08G 9/00* | (2006.01) |
| *G08G 1/07* | (2006.01) |
| *H05B 47/155* | (2020.01) |
| *F21V 23/04* | (2006.01) |
| *F21Y 115/10* | (2016.01) |

(Continued)

(52) U.S. Cl.
CPC ............ *G08G 9/00* (2013.01); *F21V 23/0471* (2013.01); *G08G 1/07* (2013.01); *H05B 47/155* (2020.01); *F21S 2/00* (2013.01); *F21V 23/0442* (2013.01); *F21W 2111/02* (2013.01); *F21W 2131/103* (2013.01); *F21Y 2115/10* (2016.08); *H04W 84/18* (2013.01)

(58) Field of Classification Search
CPC .......... A61B 2560/0214; A61B 8/4494; A61B 8/467; A61B 8/56; B06B 1/0215; B06B 1/0292; B06B 1/067; F21S 2/00; F21V 23/003; F21V 23/0442; F21V 23/0471; F21W 2111/02; F21W 2131/103; F21Y 2115/10; G08G 1/07; G08G 9/00; H04W 84/18; H05B 37/029
USPC ..... 340/539.1, 573.4, 691.1, 907; 362/332.1, 362/673
See application file for complete search history.

(56) References Cited

U.S. PATENT DOCUMENTS

| | | | |
|---|---|---|---|
| 3,500,378 | A | 3/1970 | Pickering et al. |
| 3,787,867 | A | 1/1974 | Dodge et al. |

(Continued)

FOREIGN PATENT DOCUMENTS

| | | |
|---|---|---|
| JP | 11260102 A | 9/1999 |
| JP | 3108195 U | 4/2005 |

(Continued)

OTHER PUBLICATIONS

Finley, M.D. et al., "Sequential Warning Light System for Work Zone Lane Closures," Texas Transportation System, (2011) pp. 1-23.

(Continued)

*Primary Examiner* — Ojiako K Nwugo
(74) *Attorney, Agent, or Firm* — Robert D. Buyan; Stout, Uxa & Buyan, LLP

(57) ABSTRACT

Devices, systems and methods wherein sequential signals are emitted from a plurality of signaling modules positioned in an array which demarcates a route or boundaries to be followed by a pedestrian or vehicle.

14 Claims, 9 Drawing Sheets

Related U.S. Application Data continuation of application No. 15/177,192, filed on Jun. 8, 2016, now Pat. No. 9,847,037, which is a continuation of application No. 13/774,029, filed on Feb. 22, 2013, now abandoned, which is a continuation-in-part of application No. 13/440,930, filed on Apr. 5, 2012, now Pat. No. 8,564,456, which is a continuation of application No. 12/381,565, filed on Mar. 14, 2009, now Pat. No. 8,154,424.

(60) Provisional application No. 61/069,473, filed on Mar. 15, 2008.

(51) Int. Cl.
*F21S 2/00* (2016.01)
*F21W 111/02* (2006.01)
*F21W 131/103* (2006.01)
*H04W 84/18* (2009.01)

(56) References Cited

U.S. PATENT DOCUMENTS

| | | | | |
|---|---|---|---|---|
| 3,846,672 | A | 11/1974 | Doughty | |
| 4,132,983 | A | 1/1979 | Shapiro | |
| 4,249,159 | A | 2/1981 | Stasko | |
| 4,345,305 | A | 8/1982 | Kolm et al. | |
| 4,827,245 | A | 5/1989 | Lipman | |
| 4,841,278 | A | 6/1989 | Tezuka et al. | |
| 5,294,924 | A | 3/1994 | Dydzyk | |
| 5,345,232 | A | 9/1994 | Robertson | |
| 5,428,546 | A * | 6/1995 | Shah | G08G 1/127 340/990 |
| 5,438,495 | A | 8/1995 | Ahlen et al. | |
| 5,673,039 | A | 9/1997 | Pietzsch et al. | |
| 5,754,124 | A | 5/1998 | Daggett et al. | |
| 6,299,379 | B1 | 10/2001 | Lewis | |
| 6,332,077 | B1 | 12/2001 | Wu et al. | |
| 6,486,797 | B1 | 11/2002 | Laidman | |
| 6,549,121 | B2 | 4/2003 | Povey et al. | |
| 6,614,358 | B1 | 9/2003 | Hutchison et al. | |
| D498,164 | S | 11/2004 | Delich | |
| 6,929,378 | B2 | 8/2005 | Wang | |
| D510,289 | S | 10/2005 | Dueker et al. | |
| 6,963,275 | B2 | 11/2005 | Smalls | |
| D515,957 | S | 2/2006 | Dueker et al. | |
| D515,958 | S | 2/2006 | Dueker et al. | |
| 7,088,222 | B1 | 8/2006 | Dueker et al. | |
| 7,106,179 | B1 | 9/2006 | Dueker et al. | |
| 7,182,479 | B1 | 2/2007 | Flood et al. | |
| 7,277,809 | B1 | 10/2007 | DeWitt, Jr. et al. | |
| 7,298,244 | B1 | 11/2007 | Cress et al. | |
| 7,301,469 | B1 | 11/2007 | Hoffman et al. | |
| D560,533 | S | 1/2008 | Dueker et al. | |
| D564,387 | S | 3/2008 | Rubin et al. | |
| 7,455,419 | B2 | 11/2008 | Helget et al. | |
| 7,563,158 | B2 | 7/2009 | Haschke et al. | |
| D631,582 | S | 1/2011 | Hwang | |
| 8,072,345 | B2 | 12/2011 | Gallo | |
| D654,387 | S | 2/2012 | Wilson et al. | |
| 8,154,424 | B2 | 4/2012 | Selevan | |
| 8,220,950 | B1 | 7/2012 | Sunshine | |
| D669,805 | S | 10/2012 | Edwards et al. | |
| D678,100 | S | 3/2013 | Hwang | |
| 8,550,653 | B2 | 10/2013 | Wilson et al. | |
| 8,564,456 | B2 | 10/2013 | Selevan | |
| 8,579,460 | B2 | 11/2013 | Wilson et al. | |
| 8,602,584 | B2 | 12/2013 | Ghafoori et al. | |
| 8,643,511 | B1 | 2/2014 | Batterson | |
| 8,672,517 | B2 | 3/2014 | Chung et al. | |
| 8,770,774 | B2 | 7/2014 | Ye et al. | |
| 8,786,461 | B1 | 7/2014 | Daudelin | |
| 8,949,022 | B1 | 2/2015 | Fahrner et al. | |
| 9,066,383 | B2 | 6/2015 | Gerszberg | |
| 9,288,088 | B1 | 3/2016 | McIlroy | |
| 9,437,109 | B1 | 9/2016 | Stafford et al. | |
| 9,489,809 | B1 | 11/2016 | Dever et al. | |
| D778,752 | S | 2/2017 | Selevan | |
| D778,753 | S | 2/2017 | Selevan | |
| 9,835,319 | B2 | 12/2017 | Selevan et al. | |
| 10,066,808 | B2 | 9/2018 | Fernando | |
| 2002/0008637 | A1 * | 1/2002 | Lemelson | G08G 1/07 340/907 |
| 2002/0036908 | A1 | 3/2002 | Pederson | |
| 2002/0067290 | A1 | 6/2002 | Peet, II et al. | |
| 2002/0115423 | A1 * | 8/2002 | Hatae | G08B 25/08 455/404.1 |
| 2002/0154787 | A1 | 10/2002 | Rice et al. | |
| 2002/0159251 | A1 | 10/2002 | Hart | |
| 2002/0175831 | A1 | 11/2002 | Bergan et al. | |
| 2003/0164666 | A1 | 9/2003 | Crunk | |
| 2004/0056779 | A1 | 3/2004 | Rast | |
| 2004/0100396 | A1 | 5/2004 | Antico et al. | |
| 2004/0113817 | A1 | 6/2004 | Novak et al. | |
| 2004/0124993 | A1 | 7/2004 | George | |
| 2004/0183694 | A1 | 9/2004 | Bauer | |
| 2005/0040970 | A1 | 2/2005 | Hutchins et al. | |
| 2005/0134478 | A1 * | 6/2005 | Mese | G08G 1/096716 340/901 |
| 2005/0210722 | A1 | 9/2005 | Graef et al. | |
| 2005/0248299 | A1 | 11/2005 | Chemel et al. | |
| 2005/0254246 | A1 | 11/2005 | Huang | |
| 2006/0072306 | A1 | 4/2006 | Woodyard | |
| 2006/0097882 | A1 * | 5/2006 | Brinkerhoff | G01S 5/0018 340/573.2 |
| 2006/0104054 | A1 | 5/2006 | Coman | |
| 2006/0165025 | A1 | 7/2006 | Singh et al. | |
| 2007/0038743 | A1 | 2/2007 | Hellhake et al. | |
| 2007/0099625 | A1 | 5/2007 | Rosenfeld | |
| 2007/0115139 | A1 | 5/2007 | Witte et al. | |
| 2007/0153705 | A1 | 7/2007 | Curran et al. | |
| 2007/0155139 | A1 | 7/2007 | Hecht et al. | |
| 2007/0194906 | A1 | 8/2007 | Sink | |
| 2007/0222638 | A1 * | 9/2007 | Chen | G08G 1/095 340/901 |
| 2007/0222640 | A1 | 9/2007 | Guelzow et al. | |
| 2007/0273509 | A1 | 11/2007 | Gananathan | |
| 2007/0273552 | A1 * | 11/2007 | Tischer | G08G 1/01 340/910 |
| 2008/0037431 | A1 | 2/2008 | Werb et al. | |
| 2008/0042866 | A1 | 2/2008 | Morse et al. | |
| 2008/0091304 | A1 | 4/2008 | Ozick et al. | |
| 2008/0122607 | A1 | 5/2008 | Bradley | |
| 2008/0122656 | A1 * | 5/2008 | Carani | G07C 5/008 340/995.28 |
| 2008/0150758 | A1 * | 6/2008 | Vallejo, Sr. | G08G 1/095 340/907 |
| 2008/0198038 | A1 * | 8/2008 | Yingst | G08G 1/087 340/908 |
| 2008/0242220 | A1 | 10/2008 | Wilson et al. | |
| 2008/0267259 | A1 | 10/2008 | Budampati et al. | |
| 2009/0034419 | A1 | 2/2009 | Flammer, III et al. | |
| 2009/0063030 | A1 * | 3/2009 | Howarter | G08G 1/096783 701/117 |
| 2009/0115336 | A1 | 5/2009 | Wang | |
| 2009/0187300 | A1 | 7/2009 | Everitt | |
| 2010/0259199 | A1 | 10/2010 | McDermott | |
| 2011/0249430 | A1 | 10/2011 | Stamatatos et al. | |
| 2011/0249688 | A1 | 10/2011 | Liu | |
| 2012/0051056 | A1 | 3/2012 | Derks et al. | |
| 2012/0256765 | A1 | 10/2012 | Selevan | |
| 2012/0277934 | A1 | 11/2012 | Ohtomo et al. | |
| 2012/0287611 | A1 | 11/2012 | Wilson et al. | |
| 2013/0113634 | A1 | 5/2013 | Hutchinson et al. | |
| 2013/0221852 | A1 | 8/2013 | Bowers et al. | |
| 2013/0260695 | A1 | 10/2013 | Wang | |
| 2013/0271294 | A1 | 10/2013 | Selevan | |
| 2013/0293396 | A1 | 11/2013 | Selevan | |
| 2014/0126187 | A1 | 5/2014 | Bennett et al. | |
| 2014/0210373 | A1 | 7/2014 | Baret | |
| 2015/0009682 | A1 | 1/2015 | Clough | |
| 2015/0077234 | A1 | 3/2015 | Fullam | |
| 2015/0117010 | A1 | 4/2015 | Auen | |

(56) References Cited

U.S. PATENT DOCUMENTS

| | | |
|---|---|---|
| 2015/0330616 A1 | 11/2015 | Preuschl et al. |
| 2015/0338079 A1 | 11/2015 | Preuschl et al. |
| 2015/0366275 A1 | 12/2015 | Cserfoi |
| 2015/0369456 A1 | 12/2015 | Creusen et al. |
| 2016/0174099 A1 | 6/2016 | Goldfain |
| 2016/0186971 A1 | 6/2016 | Selevan et al. |
| 2016/0248506 A1 | 8/2016 | Ryan et al. |
| 2017/0097128 A1 | 4/2017 | Stafford |
| 2017/0354019 A1 | 12/2017 | Julian et al. |

FOREIGN PATENT DOCUMENTS

| | | |
|---|---|---|
| JP | 2005113636 A | 4/2005 |
| WO | WO 2003/026358 A1 | 3/2003 |
| WO | WO 2014/099953 A1 | 6/2014 |
| WO | WO 2014/115541 A1 | 7/2014 |
| WO | WO 2014/130842 A1 | 8/2014 |
| WO | WO 2016/070193 A1 | 5/2016 |

OTHER PUBLICATIONS

Sun, C. et al., "Cost-Benefit Analysis of Sequential Warning Lights in Nighttime Work Zone Tapers", University of Missouri, Report to the Smart Work Zone Deployment Initiative, Jun. 6, 2011.

Internet Website Screen Capture, www.empco-lite.com; Sep. 6, 2010.

PCT International Search Report dated Apr. 27, 2018 in PCT Application No. PCT/US2018/017683.

International Search Report and Written Opinion dated May 28, 2014 in PCT Application US2014/017756. International Filing Date Feb. 21, 2014.

PCT International Search Report dated Mar. 18, 2016 in PCT Application No. PCT/US2015/060770.

PCT International Search Report dated Oct. 26, 2018 in related PCT Application No. PCT/US2018/041126.

Extended European Search Report dated Jun. 20, 2018 in related European Application No. 15858697.4.

Office Action dated Oct. 23, 2019 in related Japanese Patent Application No. 2017-544855.

Non-Final Office Action dated Mar. 17, 2011 in U.S. Appl. No. 12/381,565.

Non-Final Office Action dated Nov. 8, 2012 in U.S. Appl. No. 13/440,930.

Non-Final Office Action dated Oct. 8, 2014 in U.S. Appl. No. 13/774,029.

Non-Final Office Action dated Aug. 11, 2014 in U.S. Appl. No. 13/775,177.

Final Office Action dated May 8, 2015 in U.S. Appl. No. 13/774,029.

Final Office Action dated Mar. 30, 2015 in U.S. Appl. No. 13/775,177.

Non-Final Office Action dated Sep. 18, 2015 in U.S. Appl. No. 13/775,177.

Non-Final Office Action dated Mar. 25, 2015 in U.S. Appl. No. 14/186,582.

Non-Final Office Action dated Jan. 7, 2020 in U.S. Appl. No. 16/522,282.

Non-Final Office Action dated Jan. 17, 2020 in U.S. Appl. No. 16/573,762.

Non-Final Office Action dated Jan. 22, 2019 in U.S. Appl. No. 16/029,379.

Final Office Action dated Sep. 5, 2019 in U.S. Appl. No. 16/029,379.

Non-Final Office Action dated Nov. 30, 2016 in U.S. Appl. No. 15/177,192.

Non-Final Office Action dated Apr. 19, 2017 in U.S. Appl. No. 14/941,646.

Non-Final Office Action dated May 11, 2018 in U.S. Appl. No. 15/831,065.

Final Office Action dated Dec. 27, 2018 in U.S. Appl. No. 15/831,065.

\* cited by examiner

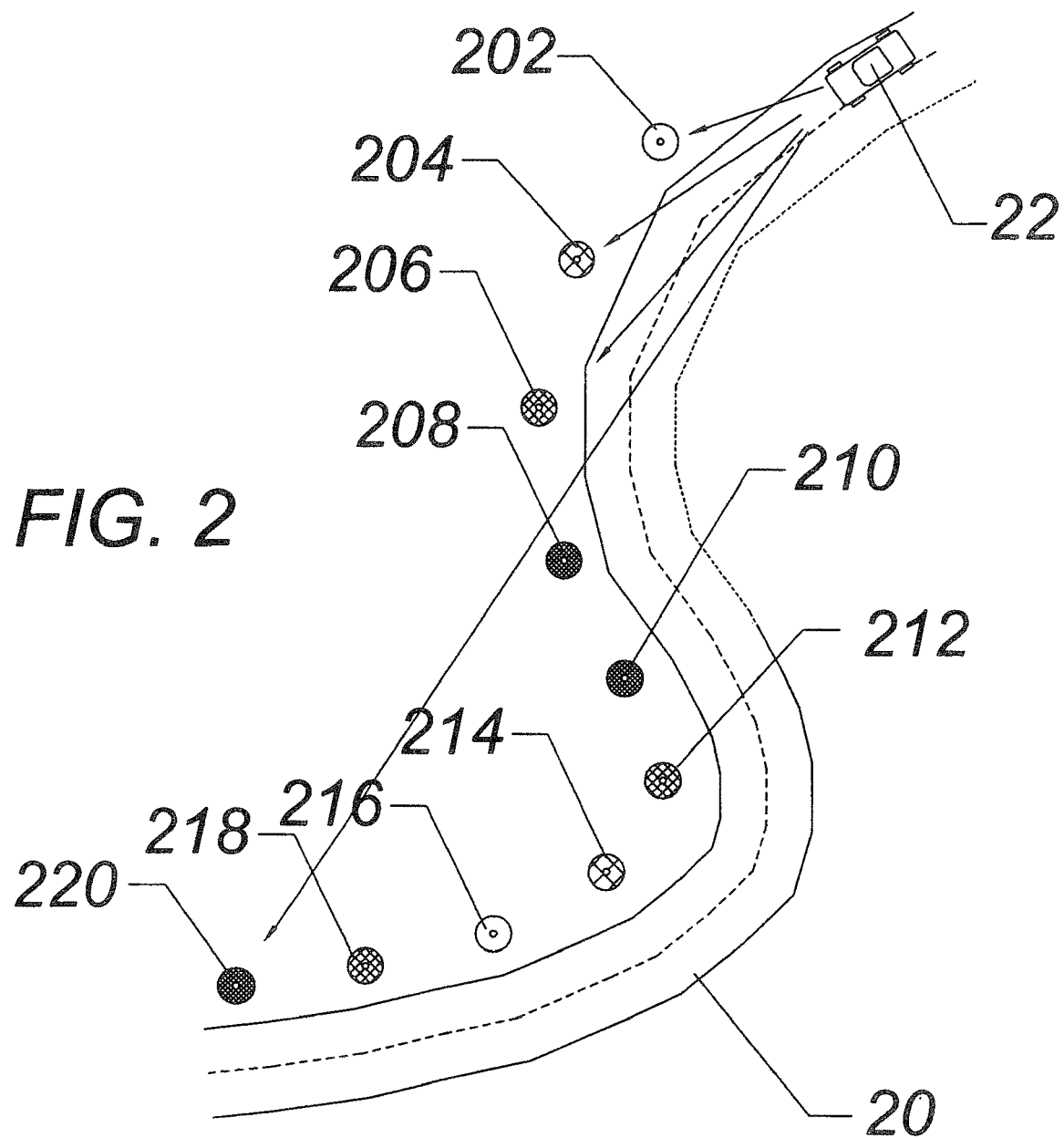

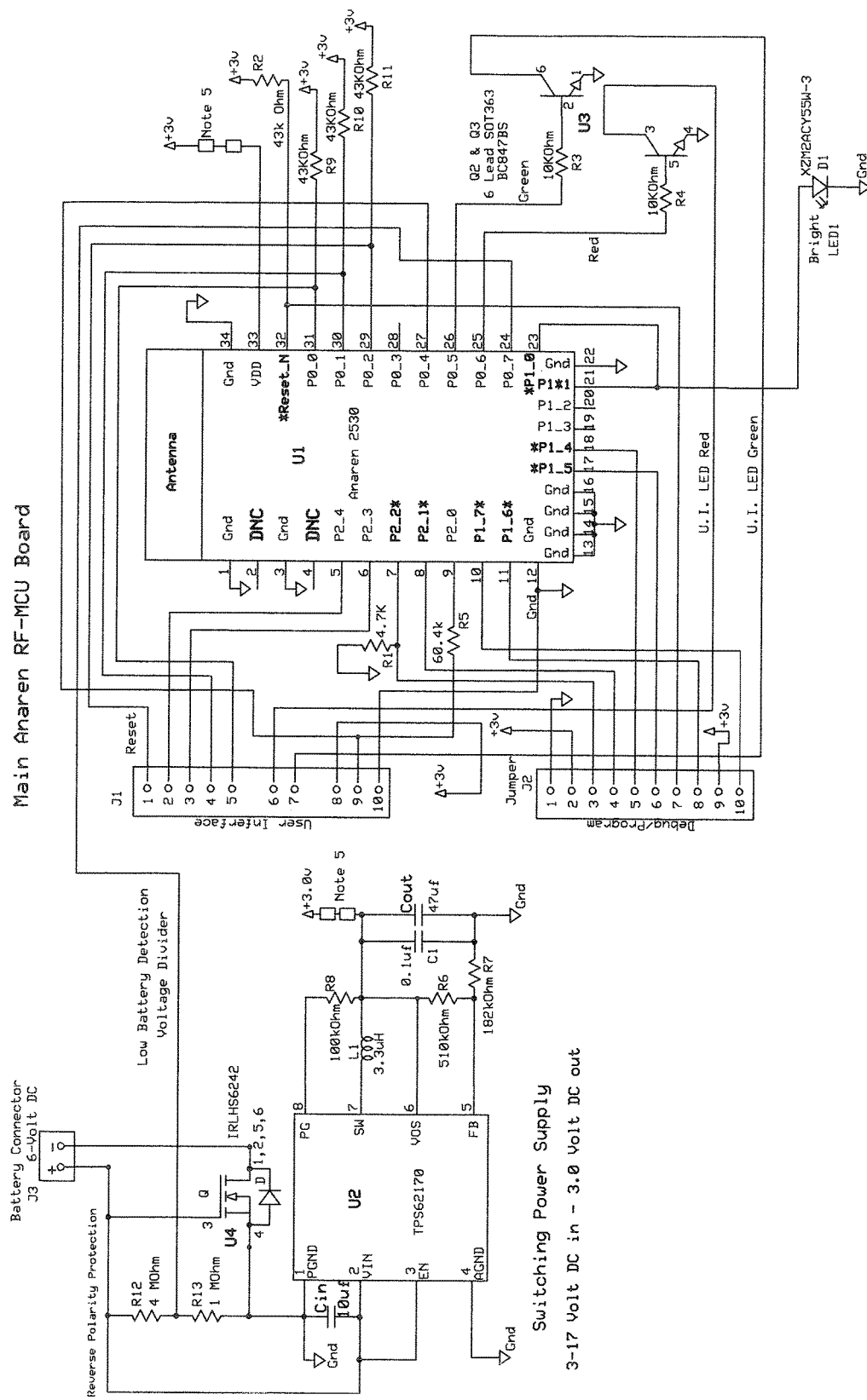

SEQUENCED GUIDING SYSTEMS FOR VEHICLES AND PEDESTRIANS

RELATED APPLICATIONS

This application is a continuation of copending U.S. patent application Ser. No. 15/847,235 filed Dec. 19, 2017, which is a continuation of U.S. patent application Ser. No. 15/177,192 filed on Jun. 8, 2016 and issued as U.S. Pat. No. 9,847,037 on Dec. 19, 2017, which is a continuation of U.S. patent application Ser. No. 13/774,029 filed Feb. 22, 2013 and now abandoned, which is a continuation-in-part of copending U.S. patent application Ser. No. 13/440,930 filed Apr. 5, 2012 and issued as U.S. Pat. No. 8,564,456 on Oct. 22, 2013, which is a continuation of U.S. patent application Ser. No. 12/381,565 filed Mar. 14, 2009 and issued on Apr. 10, 2012 as U.S. Pat. No. 8,154,424, which claims priority to U.S. Provisional Patent Application No. 61/069,473 filed Mar. 15, 2008, the entire disclosure of each such application being expressly incorporated herein by reference.

FIELD OF THE INVENTION

This invention relates generally to devices and methods for vehicular and pedestrian traffic control to aid in navigation on land, sea, and air.

BACKGROUND OF THE INVENTION

Flashing orange traffic safety lamps are commonplace along highways and waterways. Passive cones are often used to mark the boundaries or edges of roadways. They are used during road construction, traffic detours, and for emergency to route traffic through unfamiliar redirection. These passive cones are typically used over an entire 24-hour period, which includes darkness and may include poor visibility. Always on, or blinking, lights or reflectors are often used to define the border of a road that has temporarily changed and no longer follows the path that drivers expect or have become use to seeing. As shown in FIG. 1, when the detour includes a curve, the flashing light can be seen across the curve, creating confusion and disorientation. Curved roads or pathways can cause more confusion than straight roads or pathways due to human inability to judge distances, especially at night. The size of the lights or markers may not appear to substantially change in size with increasing distance from the observer. In addition, nautical buoys used to guide vessels into harbors or around dangerous shallows can sometimes be confusing and difficult to interpret.

Current alternatives do not exist. Traffic is often controlled using large, trailer-like signs with electric generators or photocells that are towed behind a vehicle and left at the detour site. These signs create a large arrow that directs traffic, but the arrow does not guide the driver around a curve or through unfamiliar road courses. Similarly, nautical traffic entering a harbor is guided via buoys and shore-based lights, which when set upon the backdrop of terrestrial lighting, can be confusing. Similarly, emergency or temporary aircraft runways for military, civilian, police, and Coast Guard air equipment, both fixed wing and rotary wing, lack proper sequenced lights that designate direction and location of the runway. This invention provides a system that is both low in cost and easy to implement, one that can be deployed quickly when necessary to aid aviators when landing or taking off on open fields or highways.

SUMMARY OF THE INVENTION

The present invention provides devices, systems and methods wherein sequential signal emitting devices (e.g., an array of lights which flash in a sequence from the first light to the last light in the array) are used for guiding pedestrians or vehicles along desired routes or within desired boundaries.

In accordance with one presently-claimed embodiment of the invention, there is provided a system and method for marking a route, path or boundary, comprising: a plurality of signaling modules, each module comprising a signaling device, a radiofrequency apparatus and a control circuitry; the modules being positionable in an array which marks a route, path or boundary; whereby the modules positioned in the array will undergo radiofrequency communication with one another and the control circuitry will cause the signaling devices of the modules to emit signals in sequence from a first-positioned module of the array to a last-positioned module of the array; and wherein the modules are programmed to self detect their sequential order in the array and to self-adapt to changes in the positional order of the modules, elimination of one or more modules within the array and insertion of one or more additional modules within the array, thereby maintaining the emitting of signals in sequence from a first-positioned module of the array to a last-positioned module of the array.

In accordance with another presently-claimed embodiment of the invention, there is provided a system and method for guiding a pedestrian or vehicle to one of a number of possible destinations within a particular geographic area, building, campus, structure or the like, by the following steps: A) obtaining or providing a system which comprises a plurality of modules, each module comprising a signaling device, a radiofrequency apparatus and control circuitry, wherein the modules are positionable in an array which marks a route, and wherein the control circuits of the modules are operative to communicate with one another on a particular route via the radiofrequency apparatus and to cause the signaling devices, of the modules to emit guidance signals in sequence from a first module of the array to a last module of the array; B) positioning modules of the system along routes to a plurality of possible destinations; C) programming a transmitter for a selected one of the possible destinations, thereby causing the transmitter to transmit control signals which selectively trigger the modules located on the particular route to emit sequential guidance signals to the selected destination; and, D) causing the transmitter to be carried by the pedestrian or vehicle so that the pedestrian or vehicle may follow the sequential guidance signals to the selected destination. In some embodiments, the signaling modules may be embedded in or adhered to surface(s) traveled upon by the pedestrian or vehicle, such as road(s), driveway(s), taxiway(s), floor(s), sidewalk(s) and walkway(s). In other embodiments, the signaling modules may be positioned on structures which demarcate routes to desired locations, such as buoy(s), channel marker(s), fence(s), wall(s), delineator(s) and traffic channelizing device(s). Also, in some embodiments, the guidance signals emitted by modules on one route may be distinguishable (e.g., a different color) from guidance signals emitted by modules on another route. Also, in some embodiments, guidance signals emitted by modules in response to one transmitter may be distinguishable (e.g., a different color) from guidance signals emitted from modules in response to another transmitter.

In accordance with yet another presently-claimed embodiment of the invention, there is provided a system and method for guiding pedestrians or vehicles along an intended path of travel having at least first and second boundaries, by the steps of: A) obtaining a plurality of signal emitting modules which undergo radiofrequency communication with one another and which include control circuitry which causes the modules to emit signals in sequence from a first-positioned module of the array to a last-positioned module of the array; B) positioning a first array of signal emitting modules in sequence along a first boundary of the intended path of travel; C) positioning a second array of signal emitting modules in sequence along a second boundary of the intended path of travel and ID) programming the control circuitry so as to pair modules in the first array with adjacently positioned modules in the second array such that each pair of modules will emit signals in unison, whereby the pairs of modules emit signals in unison and in sequential order from the first pair to the last pair.

For the purposes of summarizing the invention, certain aspects, advantages and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein. These and other objects and advantages of the present invention will be more apparent from the following description taken in conjunction with the accompanying drawings.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention. Throughout the drawings, reference numbers are re-used to indicate correspondence between referenced elements.

FIG. 2 illustrates a road with an approaching vehicle and a plurality of sequenced lights, which can reduce the confusion to the vehicle driver, according to an embodiment of the invention;

DETAILED DESCRIPTION OF THE PREFERRED EMBODIMENTS

The invention may be embodied in other specific forms without departing from its spirit or essential characteristics. The described embodiments are to be considered in all respects only as illustrative and not restrictive. The scope of the invention, is therefore indicated by the appended claims rather than the foregoing description. All changes that come within the meaning and range of equivalency of the claims are to be embraced within their scope. Throughout the detailed description and remainder of this document, the author uses the term "traffic" to refer to motor vehicular, nautical, pedestrian, or aircraft movement.

Figure 1:
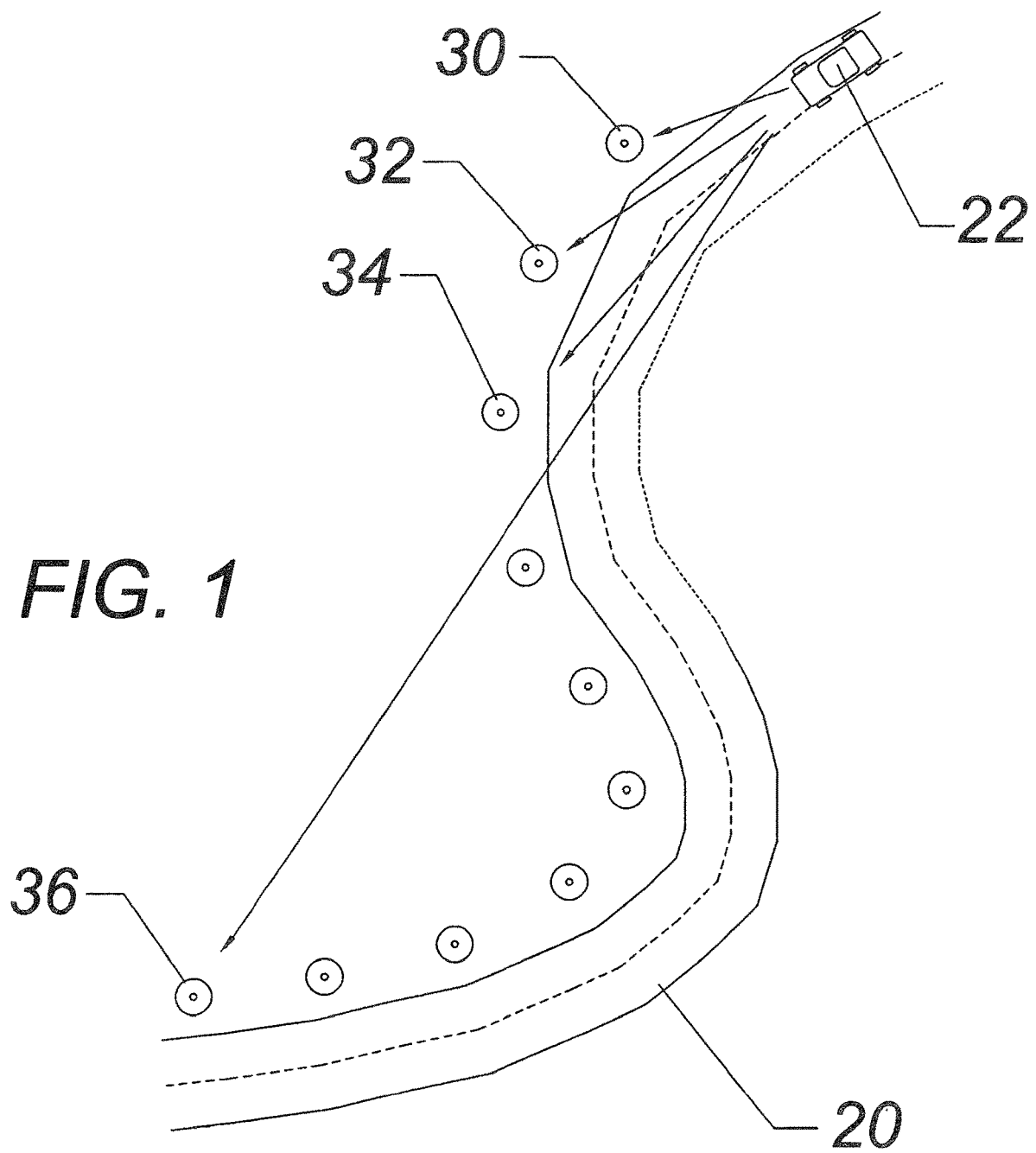
FIG. 1 illustrates a road with an approaching vehicle and a plurality of typical randomly flashing lights, which are currently used and which can cause confusion and disorientation to the vehicle driver, according to an embodiment of the invention.

FIG. 1 illustrates a road 20 with a vehicle 22 driving along the road 20 into a turn. A plurality of flashing markers, including markers 30, 32, 34, and 36, are distributed along side the road 20. These markers 30, 32, 34, 36 can be passive with no illumination or signaling, or they can flash in unsynchronized patterns, in unison, or the like. The driver (not shown) of the vehicle 22 will see these markers and can easily be confused, especially at night, because the contour of the road and the turn may not be clear.

FIG. 2 illustrates a road 20 with a vehicle 22 moving along the road 20 into a turn. A plurality of sequenced flashing markers 202-220 is distributed along the road 20.

Referring to FIG. 2, the lights can be placed alongside a street 20. In this illustration, ten lights 202-220 are distributed around a double corner. The first light 202 is closest to the oncoming car 22 with a tenth light 220 being furthest from the oncoming car. The observer, traveling with the car 22, sees the first light 202 flash on and then turn off. The second light 204 can flash on and then off shortly after light number 202. The third light 206 flashes on and off slightly after light 204 and so on. The observer or driver of the vehicle 22 observes a pattern that guides the eye around the corner of the road 20 in a manner that is not confusing or subject to misinterpretation. The lights, in an embodiment, can further be shaped like arrows pointing in the desired direction of travel. The arrows can be simple chevron shapes or they can be arrows with pointed heads, axially linear bodies, and can even comprise tails. In another embodiment, some lights can be arranged in a group to form a pattern, such as an arrow, whereby all lights in a given pattern or grouping are synchronized to turn on and off at approximately the same time. Thus, although different patterns can turn on and off at different times, lights within the pattern can be linked electronically to turn on and off as a unit, or substantially simultaneously.

When a plurality, defined as a series of two or more, of flashing lights 202-220 are placed on the road 20 or in the water to define a route or detour, or on a temporary runway, sequencing of the flash of each light will aid the driver, pilot, or helmsman in determining the direction of travel. The minimum number of lights 202-220 in a given system is two, while the maximum is unlimited, but practically can include ten, or several hundred, or several thousand, lights over the course of 0.01 miles to 100 miles or more.

Each light 202-220 is controlled by a logic circuit. The first light in the sequence 202 can flash at a rate determined by the user. The rate can be pre-determined, pre-set, or set at the time of installation. When the light flashes on, it sends a signal, either by radio wave, infrared signal, or via hard wire to the next light in sequence, which delays a predetermined time interval before it flashes. Alternatively, the first light 202 can delay a given amount of time prior to sending its signal to the second light 204, and so forth. This 2nd light 204 then sends a signal via radio wave, infrared, or via hard wire to the 3rd light 206 in sequence, and so on. The delay between receiving the trigger signal from the light lower in sequence number and the initiation of the flash is user defined, and may range from milliseconds to several minutes.

Figure 3C:
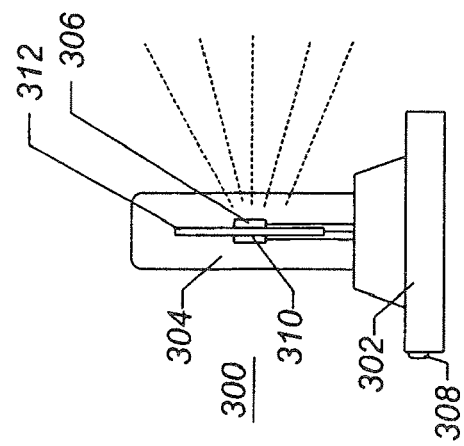
FIG. 3C illustrates a side view of an exemplary signaling device with optical output only on one side and said optical output shielded from view from the other side of the device, according to an embodiment of the invention.
Figure 3B:
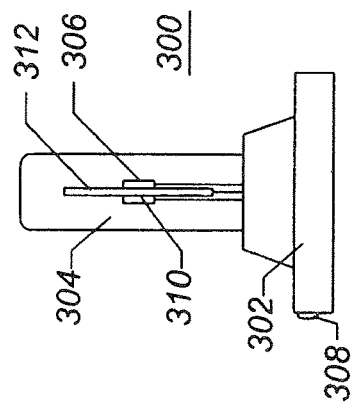
FIG. 3B illustrates a side view of an exemplary signaling device, according to an embodiment of the invention.
Figure 3A:
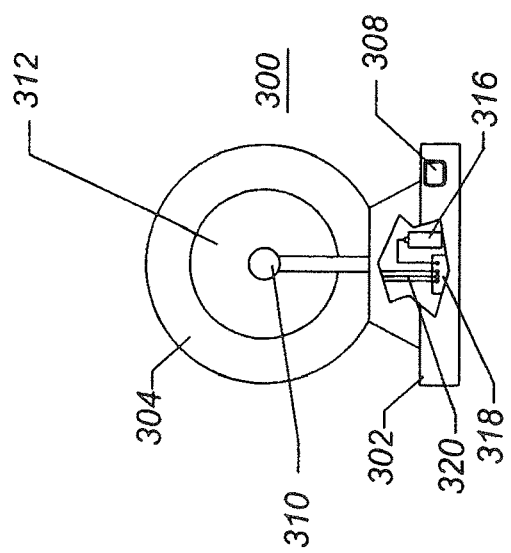
FIG. 3A illustrates a front view of an exemplary signaling device, according to an embodiment of the invention.

FIG. 3A illustrates a front view of a signaling unit 300. The signaling unit 300 comprises a base 302, a signal shell 304, a light source 310, a shield 312, a controller 318, a power supply 316, an on-off switch 308, and an electrical bus 320.

Referring to FIG. 3A, the light source 310, optical output device, or signaling device can be incandescent, light emitting diodes, discharge tube, as in, stroboscopic light, fluorescent, etc. The logic circuit or controller 318 can comprise an electronic circuit, further comprising digital, analog, or hybrid technologies. The controller 318 can be fabricated of discreet components or it can be fabricated as a monolithic module or chip that performs all or most of the required functions. The logic circuit or controller 318 further comprises input and output ports that are operably connected to the signaling device 310. The inputs can include electrical power from the power supply 316, control and command input channels, on-off switching 308, and signal receivers. The outputs can include signal transmitters and lights or other optical, audio or other sensory signaling devices.

The power supply 316 of the device can comprise one or more batteries, and can use rechargeable batteries or those that are to be discarded. The batteries or power supply 316 can be operably connected to the power input of each individual system. The power supply 316 can comprise photovoltaic cells (not shown), which may be used to recharge batteries, allowing for sunlight to provide power to the device. The controller can comprise photo detectors to provide the option of the user to have the sequencing and flashing of lights to turn on automatically at sunset, and to turn off at sunrise.

When using radio frequency to send the signal, the range is anticipated to be less than about 100 meters, allowing the use of low-wattage output transmitters. The system can operate using protocols and technologies such as Bluetooth™, ZigBee™, or other standardized short-range protocols in the radio frequency spectrum.

FIG. 3B illustrates a side view of a signaling unit 300. The signaling unit comprises the base 302, the on-off switch 308, the lamp cover 304, the second lamp 306, the first lamp 310, and the illumination shield 312.

Referring to FIG. 3B, the shield 312 can be configured to prevent light from the output device 310 from being seen by an observer looking at the system 300 from a given direction. Thus, in an embodiment, the system 300 can have the option of emitting light in one direction only, providing guidance for traffic in one direction while not being visible by, and thus not having an impact on, traffic from another direction. In an embodiment, traffic coming from opposing directions (substantially 180 degrees apart) can both see the system light 310 but traffic only in the first direction can visualize the illuminated sequencing of the lights while the traffic from the other direction cannot see the lights 310. Directionality can be maintained sufficiently to be visible from traffic with vectors separated by as little as 30 degrees or as much as 180 degrees. Such directionality can be accomplished with baffles, shields, lenses, or the like 312. The system 300 can be incorporated in a unit that will mount onto existing traffic barriers, floating buoy, or incorporated into flexible orange (or other color) traffic cones. The baffles or shields 312 can have their orientation adjusted by installers, once the modules are in place, by rotating the baffles or shields 312 appropriately. In another embodiment, the baffles or shields 312 can automatically be adjusted by detection of the orientation of the other light modules in the system. In addition, the device can be constructed with two LEDs, 306 and 310 each facing in the opposite direction. The device can be programmed to provide proper sequencing for drivers approaching from opposite directions, that is, more than one signaling device 310 can be provided. Each LED or signaling device 310 can be independently linked to the proceeding and trailing light 310 in sequence allowing for the progression of light 310 movement in opposite directions simultaneously.

Further referring to FIG. 3B, different color lights or LEDs, for example 306, 310, can be mounted inside the lamp housing 304 such that the sequence of lights could provide color patterns. For example, the standard color might be yellow, with every $5^{th}$ light revealing red color, such that as the light sequence traverses a distance, every $5^{th}$ light flashes red in progression.

FIG. 3C illustrates a signaling unit 300 when viewed from the side showing light being emitted from the second lamp 306 and visible only from that side of the shield 312. No light coming from lamp 310 can be seen from the direction where lamp 306 shines.

Figure 4:
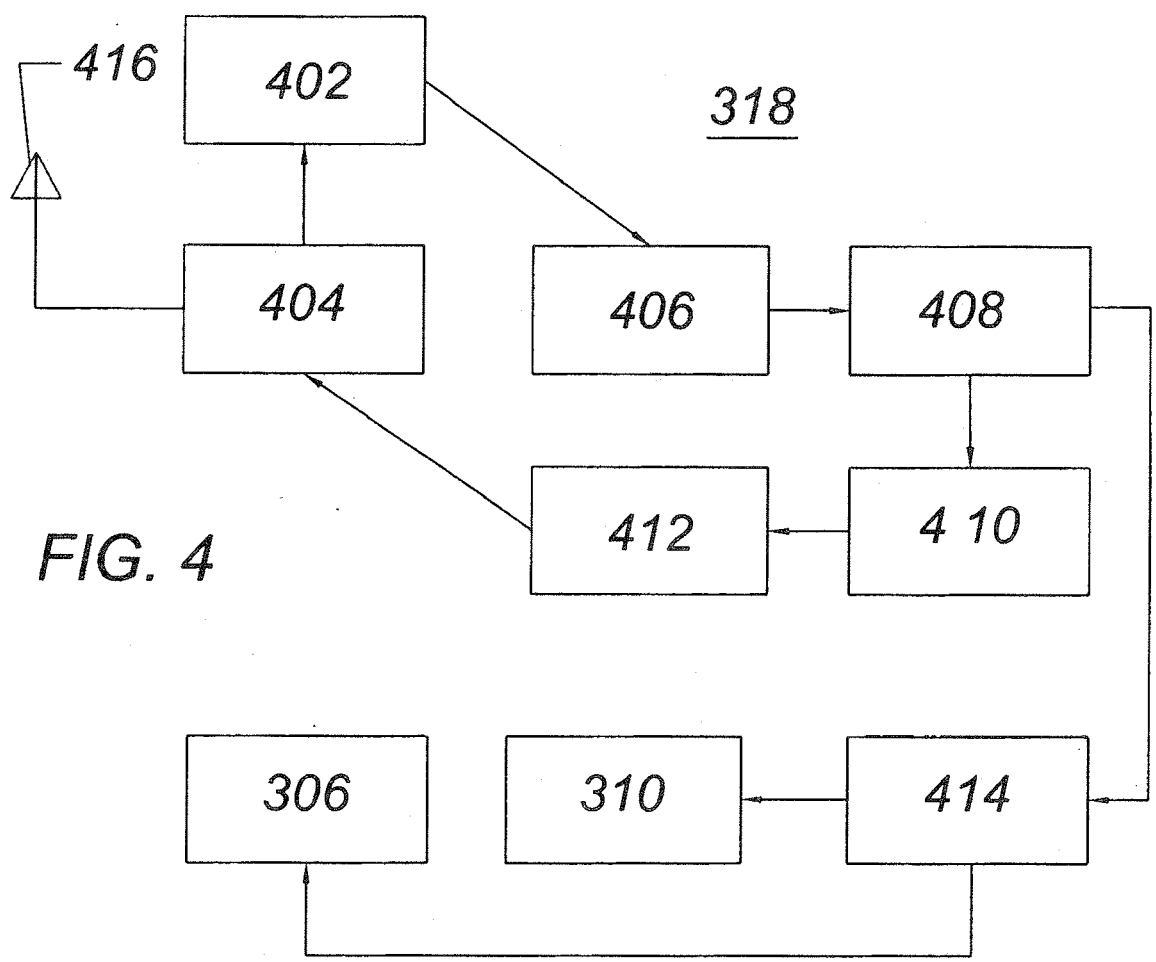
FIG. 4 illustrates a block diagram of the circuitry of the sequenced vehicle light system, according to an embodiment of the invention.

FIG. 4 illustrates a block diagram of the electrical components of the controller 318. The controller 318 comprises a radio frequency (RF) demodulator receiver 402, an RF amplifier 404, a decoder 406, a micro controller 408, an encoder 410, an RE transmitter 412, an LED driver 414, a first LED 310, a second LED 306, and an antenna 416.

The functional diagram of FIG. 4 reveals a radio receiver 402 that detects a digital code modulated on a radio frequency signal. This signal is demodulated, and the resulting digital code is provided as input to the decoder 406. In an exemplary embodiment, each device transmits this code, three times. If the code matches the appropriate sequence number of this unit on all three occasions, then the microcontroller 408 provides a confirmation signal, which then utilizes the LED driver 414 to turn on the first LED 310. At the same time, the microcontroller 408 sends a signal to the encoder 410, which provides a coded digital signal to a modulator (not shown) and then to the radio transmitter 412. This digitally encoded radio signal is now transmitted to all neighboring units. Only the unit next in sequence that matches this code will respond with the appropriate flash of the LED 310 mounted thereon.

The microcontroller 408 can be receiving multiple signals in rapid succession, and this provides the opportunity for the microcontroller 408 to turn on or off two or more LEDs 310, 306 at the appropriate time. This results in the capability of having multiple simultaneous progressive flashing sequencing for traffic moving in opposite directions.

Each device's sequence number can be programmed using an input keyboard, an electrical transmission from an external controller, or hardwired and controlled by a local switch such as thumbwheel or membrane switch. The sequence can be input through the individual module control input port. It can also be programmed from a distance using radio frequency, microwave, inductance, infrared or other electromagnetic radiation. Hence, the devices, or modules, can be deployed without regard to sequence number, and when in place, the user can simply walk along the path and define each devices sequence number. However, the unique aspect of this invention is the use of a "mesh" network that allows for the lights to assume the proper sequence number simply by applying power in the proper order or with proximity sensors. For example, in an embodiment, the user would simply locate a light and turn it on. The electronic circuitry and logic would "listen" to detect whether there were any other lights currently on and transmitting a signal. If no other signal is received in a predetermined period of time, then this device would assume identity number 1. When the $2^{nd}$ light is turned on, it would listen for any other devices, and upon "hearing" number 1 transmitting a signal, but no other transmitted signals, it would then say, "I must be number 2". When turned on, the $3^{rd}$ light would receive (or "hear") numbers 1 and 2, and if no other signals were heard it would then assume that "I must be number 3", and so on. When used in a nautical setting, the buoys could be activated in order when placed in the water. In addition, the user can define the length of flash and the delay between reception of triggering signal and flash with input on the control panel of each device. In other embodiments, an array of modules is placed and once activated, would self-determine their order in the array, position in the system, etc., and set the activation sequence accordingly.

The flashing sequence is programmable, and may reverse to produce a particular guide or warning. Furthermore, a failure of one unit would not influence performance of the entire system. Should one unit fail, the next higher number will wait a predetermined number of milliseconds, and upon failing to receive a transmission from the failed unit, will continue to operate without interruption. This same methodology, that is the mesh network, provides a simple means by which a failed unit could be replaced. The person replacing the failed unit simply has to turn the replacement unit on. It will listen for a predetermined length of time. If it "hears" a number 10, for example, and a number 12, but no signal is received from a number 11, then it will assume that number 11 is out of the system and simply adopt that code number.

In another embodiment, the system of lights or modules can be configured to provide an indication of distance from the observer. The signaling system, of which the lights are the most visible part of each module, can comprise lights that are visibly dimmer the higher the number is in the sequence to which they are assigned (or the opposite). The lights can, in another embodiment, illuminate at different visible wavelengths to provide some indication of distance. While this methodology is not as effective for a color-blind person, longer frequency colors such as the reds appear to be different distances from an observer than do colors near the cooler end of the spectrum (blue for example). Thus lights with lower sequence numbers can illuminate at different emission frequencies than lights, which are assigned higher numbers in the sequence. In another embodiment, the lights can be assigned to flash on for shorter periods of time, the further they are from the observer (higher in the sequence chain) than lights, which are closer to the observer (lower in the sequence chain). Thus, the lights, which are on longer will appear to be relatively brighter and thus closer to the observer. In yet another embodiment, the lights that are closer to the observer can flash on and off a number of times during their assigned "on" cycle. Lights further from the observer can be assigned to flash on and off a relatively lower number of times during their "on" cycle, thus appearing slightly dimmer or further away from the observer. Any combination of the aforementioned systems can be used to assist the driver or observer in determining the path in which the lights or signaling devices are arrayed, and thus the safe path that can be followed by the observer.

Figure 5:
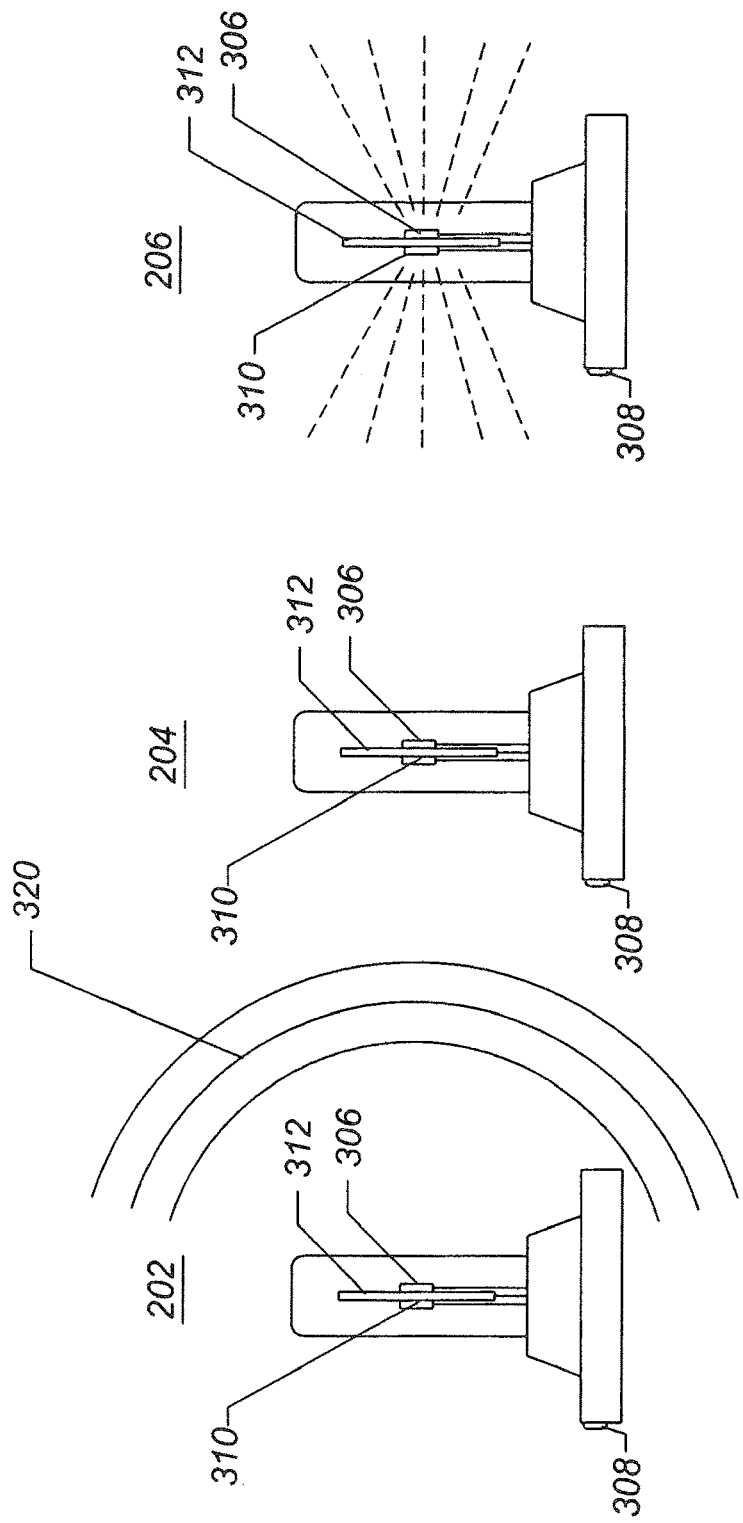
FIG. 5 illustrates three sequenced lights configured for traffic flow visualization, according to an embodiment of the invention.

FIG. 5 illustrates the logic control used to create sequenced flashing of lights as illustrated in FIG. 2. FIG. 5 shows module number 202 comprising the light or sensory signaling devices 306,310, the controller, and a shield 312. The controller for light number 202 is shown transmitting an electromagnetic signal 320 to the controller for light number 204. There is no signal being emitted between the controller, or module, for light number 20 and the controller or module for light number 206 at this point in time. The signal from module number 204 to module number 206 will be generated at a future instant in time. The shield or baffle 312 prevents viewing of the lights 306, 310 from an undesired direction, thus preventing confusion on the part of drivers coming from an oncoming direction, for example. Both lamp 306 and 310 are illuminated in module 206.

A system of signal emitting modules 300 is disclosed. The modules emit light or other signals to warn oncoming traffic that a road or other pathway has changed or is traversing a tortuous pathway. The modules 300 are interconnected in a sequence so that they flash on and off in a pattern that leads the driver or observer along a path with less confusion than with randomly flashing or steady lights or reflectors. The modules are self-powered and can be arrayed first and programmed following deployment. The programming can be done with the described mesh technology, an external controller, or by dialing a specific number in each of a plurality of distributed controllers. The modules can improve highway safety by reducing driver confusion. The modules are arrayed to prevent a driver from seeing them from an oncoming direction, or, using two independent sequencing software programs for opposite facing LEDs, the driver coming from the opposite direction will have his or her own guiding system.

The visual output device, which can be a light, led, or other visual emitter can be highly directional, omni-directional, or quasi-directional. Each visual output device can be set to emit electromagnetic radiation in the visible range or a range outside the visible spectrum. Such radiation can be in the infrared, ultraviolet, microwave, or radio frequency range. Such radiation can be configured to be received by, and interact with, a receiver in an approaching or departing vehicle that can display the information on a Global Positioning System (GPS) display or other mapping device within the vehicle. Furthermore, each module supporting the visual output devices can comprise a GPS receiver that can provide its position and then transmit that position to the approaching or leaving vehicle such that the information may be used to locate one, a few, or all of the modules on a GPS display or other mapping system.

Figure 6:
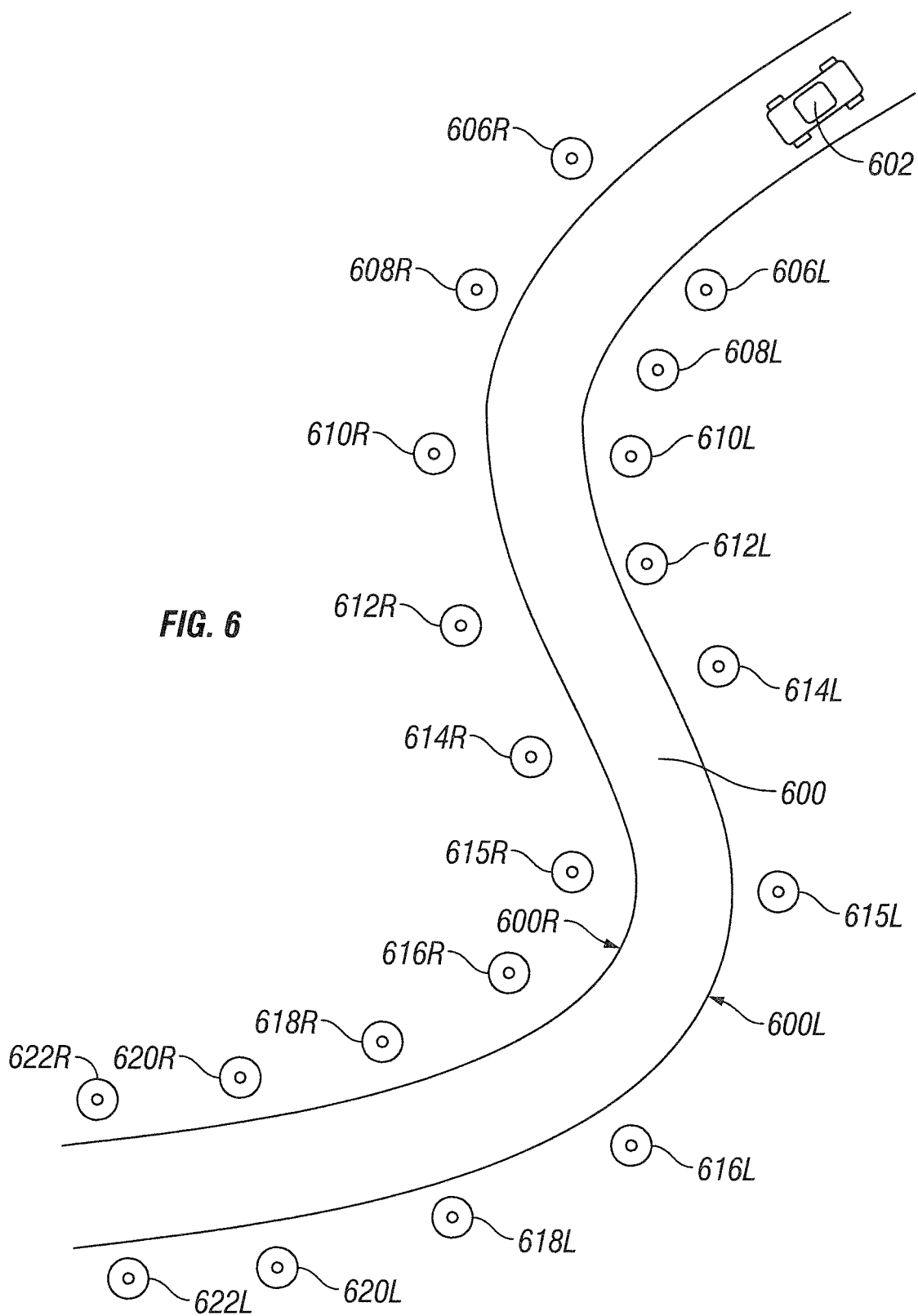
FIG. 6 is a schematic diagram of a roadway having pairs of sequenced signaling devices of the present invention demarcating the right and left edges of the roadway.

In addition to a single row of sequenced signaling modules, a sequenced signaling system of the present invention can be deployed in such a way as to provide for two or more rows of sequenced signaling modules (e.g., signaling sequenced lights) which demarcate opposite boundaries of a lane or other intended path of travel. An example of this is shown in FIG. 6. In this example, an intended path of travel 600 has a right boundary 600R and a left boundary 600L. It is desired to guide a vehicle 602 along this path of travel 600. Pairs of signaling modules comprising sequenced signaling lights 606R/606L, 608R/608L 610R/610L, 612R/612L, 614R/614L, 616R/616L, 618R/618L, 620R/620L and 622R/622L are positioned along the right and left boundaries 600R, 600L as shown. These sequenced pairs of signaling lights are programmed so that the lights in each pair (e.g., 606R and 606L) go on and off in unison (e.g., at substantially the same time) and further such that the pairs of signaling lights flash in a progressing "down-stream" sequence (i.e., 606R and 606L . . . then 608R and 608L . . . then 610R and 610L . . . then 612R and 612L . . . , etc.). Thus, the pairs emit signals in unison and in sequential order from the first pair to the last pair. In this manner a pedestrian or vehicle such as a motor vehicle on a road, marine floating vehicle (boat or ship), or fixed wing or rotating wing aircraft would see a left-right pair of lights guiding them in the direction of travel. This would, in effect, define the width of a lane or intended path of travel 600 that the motor vehicle or boat or aircraft might travel.

Figure 7:
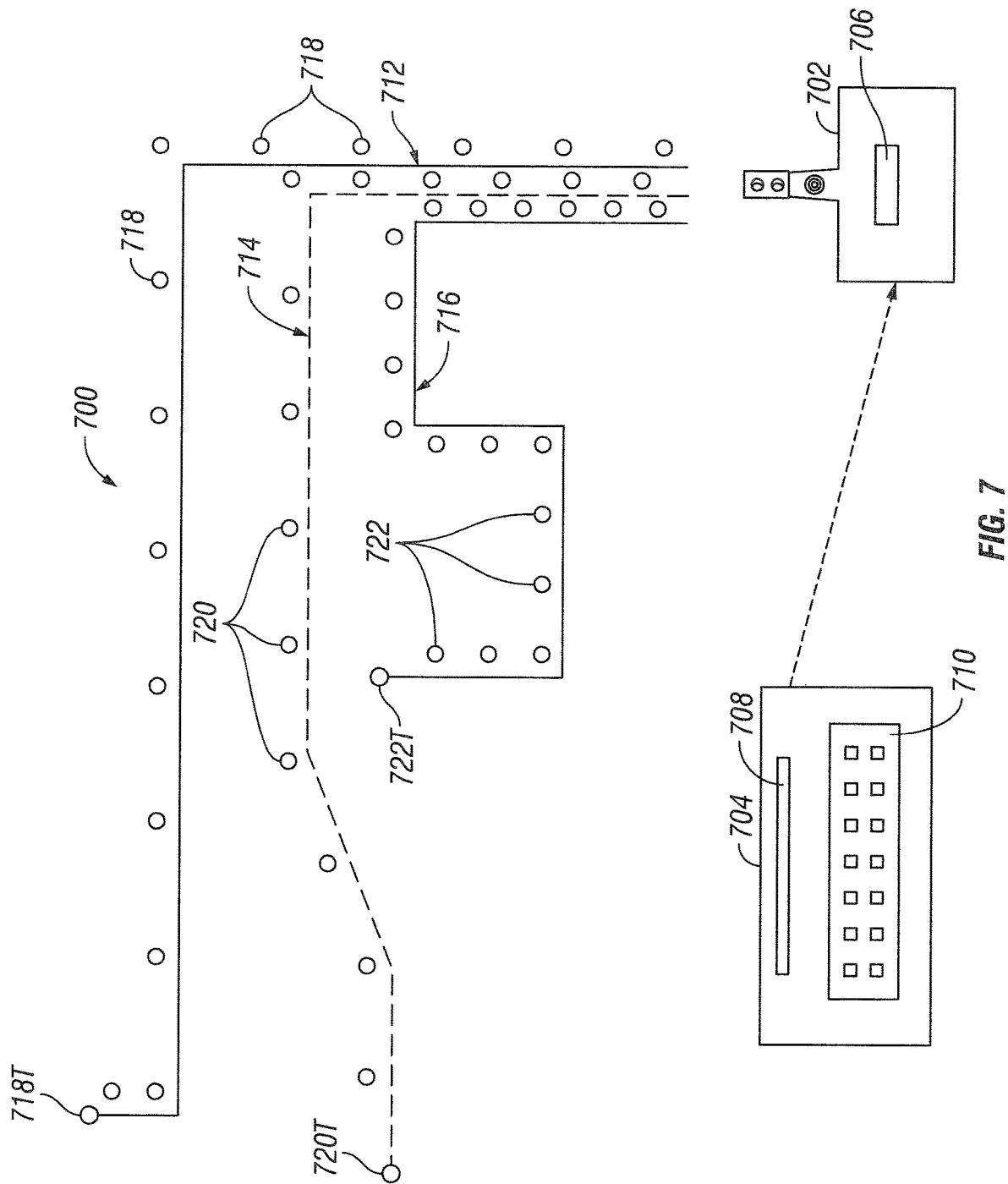
FIG. 7 is a schematic diagram showing a guidance system of the present invention for guiding pedestrian or vehicular traffic to a selected location.

In another embodiment, the invention is useable to guide pedestrians or vehicles on one of a selected number of pre-set paths. For example, FIG. 7 is a schematic illustration of a system 700 which may be used to guide a visitor to a specific room or location within a large building, campus, complex of buildings, etc. In this example, the system 700 comprises a destination signal transmitting device 702 comprising a programmable transmitter 706, a programming device 704 useable to program the transmitter 706 to cause it to emit signals for a desired destination and a plurality of arrays of sequential signaling devices 718, 720, 722 positioned along possible routes 712, 714, 716. The transmitter 706 may comprise any suitable type of programmable signal emitting chip or apparatus, examples of which include CC2531 System on a Chip (SoC) available from Texas Instruments Incorporated, Dallas, Tex. or the A253OR24AZ1 System on a Chip available from Anaren, Inc., East Syracuse, N.Y. The transmitter 706 may be housed or incorporated into various types of portable housings or secondary articles, such as a clip-on visitor identification card (shown in the example of FIG. 7), dongle, card on a lanyard, clip on box or strip, etc. The programmer 504 may be any suitable type of device useable to program the transmitter 706 to emit signals for a desired destination on one of the possible routes 712, 714, 716. In the particular example shown in FIG. 7, the programming device 704 comprises a housing having a user interface 710 such as a keyboard and a slot 704. The operator uses the user interface 710 to input a desired destination 718T, 720T or 722T located on one of the possible routes 712, 714, 716. The destination signal transmitting device 702 is then inserted into slot 504 and electronics within the housing program the transmitter 706 to emit signals that are specific for the desired destination 718T, 720T or 722T. Commercially available examples of such programming electronics includes those available in connection with the CC2531 System on a Chip (SoC) available from Texas Instruments Incorporated, Dallas, Tex. or the A253OR24AZ1 System on a Chip available from Anaren, Inc., East Syracuse, N.Y. After the transmitter 706 has, been programmed for the desired destination, the visitor then wears or carries the destination signal transmitting device 702 and signals emitted from the transmitter 706 are received by, and cause sequential signals (e.g., flashes of light) to be emitted by, only those sequential signaling devices 718, 720 or 722 positioned along the particular route 712, 714 or 716 that leads to the desired destination 718T, 720T or 722T. In some installations, the sequential signaling devices 718, 720 or 722 may be embedded in or adhered to the surface(s) traveled upon such as floor(s), sidewalk(s), walkway(s) and the like and may comprise LED illuminated circuits that would read via radio or other media (sound, light, radio frequency) the "code" that would trigger the microcontroller to display the proper sequence guiding the pedestrian to their destination. In some embodiments, the signals emitted by the sequential signaling devices 718, 720 or 722 on one of the possible routes may be distinguishable (e.g., different colored light flashes) from those on another possible route, or the signals from the sequential signaling devices 718, 720 or 722 triggered by one particular transmitter 706 may be distinguishable (e.g., different colored light flashes) those triggered by another particular transmitter 7-6, thereby preventing confusion between routes being followed by 2 or more visitors at the same time (e.g., one visitor might follow the yellow string, while another green, and yet another the red sequenced string of light). This system 700 may be used to direct movement of visitors or others, on foot or in vehicles, within large structures or campuses, such as hospitals, shopping malls, military establishments (Pentagon, military bases, etc.), universities, factories, amusement parks, zoos, etc. Power for the destination signal transmitting device 702 and/or sequential signaling devices 718, 720 and 722 may be supplied via battery, mains, or solar charging systems. External programming and control of various parameters (software updates, light sequence pattern, etc.) of the sequential signaling devices 718, 720 and 722 could be accomplished using an external "dongle" or a "smart phone" software application. The user could download an application to "speak" to the, sending software updates, timing sequences, etc.

Figure 8:
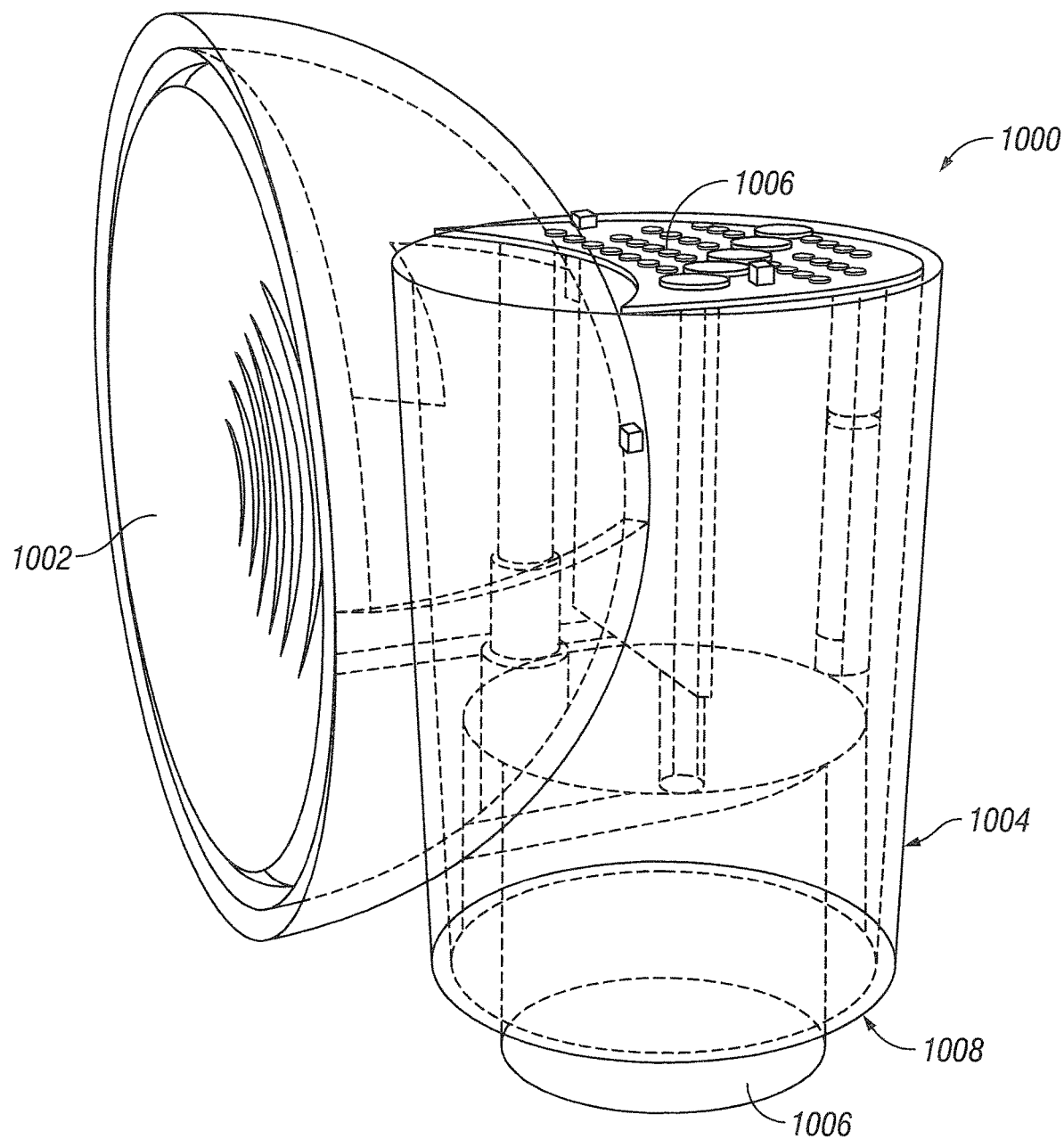
FIG. 8 is a perspective view of a sequential signaling light of the present invention.

FIG. 8 shows one of many possible embodiments of a sequential signaling light device 1000 of the present invention. This device 100 comprises a flashing light 1002 on a housing 1004. Within the housing is electronic circuitry, including a microprocessor, battery or other power source and a transmitter/receiver. As explained above, a plurality of these sequential signaling light devices 1000 may be positioned in a desired array, one after another. The electronic circuitry 1004 both receives and transmits necessary analog and digital information to the next light signaling device 1000 in sequence. The signaling devices do not have to be numbered, nor does a user have to set each light physically in a particular order. The design provides information inherent in the system, utilizing "mesh", or matrix, technology. There is no need for any user interface, such as a switch, to designate the number of each light. Adjacent lights or modules can be set to recognize their position in a sequence automatically such that the user need not physically set the sequence of module firing. This position recognition can be accomplished using proximity sensors, global positioning receivers, RFID devices, and the like. The light signaling devices 1000 may be programmed to self-detect and adapt to the ordering of the individual signaling devices 1000 within an array. If one device 1000 within an array is removed or becomes non-functional, the remaining devices 1000 in the array will sense that such device has been removed or is not functioning and will automatically re-adjust their sequential communication and signal timing accordingly. Similarly, if the positions of individual signaling devices 1000 within an array are switched or rearranged, the signaling devices 1000 in that array will self-adapt to the switched or rearranged positioning of individual devices 1000 so that the desires sequential (from one to the next, to the next, to the next, etc.) is maintained. Additionally, if an additional or replacement device 1000 is inserted within the array, the remaining devices 1000 within the array will sense signals being emitted from the new device and will include incorporate the new device into the array such that the new device will emits signals in sequence along with the other devices in the array. Also, in some situations the may be two or more arrays of devices positioned closely enough to one another that signals from devices 1000 in one array could be received by devices 1000 in another array. In this regard, the electronic circuitry of the devices 1000 may be programmed to be array-specific so that sequential communication is maintained within each separate array without inadvertent crosstalk between devices in neighboring or nearby arrays. Also, in at least some embodiments, the electronic circuitry of the signaling devices 1000 may be programmed or reprogrammed to effect signaling variables (e.g., timing of flashes, color of flashes, pattern of flashes, system operational hours, etc.) either by way of a user interface on each signaling device 1000 or from a central control/programming device, which may comprise a smartphone, laptop computer, tablet computer or other portable device. One example of software useable to program these signaling light devices 1000 in this manner is described in U.S. Provisional Patent Application No. 61/767,937 entitled Methods and Systems for Synchronizing the Behavior of Discrete Digital Devices, also filed on Feb. 22, 2013, the entire disclosure of which is expressly incorporated herein by reference.

It is to be appreciated that the invention has been described here above with reference to certain examples or embodiments of the invention but that various additions, deletions, alterations and modifications may be made to those examples and embodiments without departing from the intended spirit and scope of the invention. For example, any element or attribute of one embodiment or example may be incorporated into or used with any other embodiment or example, unless otherwise specified or unless doing so would render the other embodiment or example unsuitable for its intended use. Also, where the steps of a method or process have been described or listed in a particular order, the order of such steps may be changed unless otherwise specified or unless doing so would render the method or process unworkable for its intended purpose. All reasonable additions, deletions, modifications and alterations are to be considered equivalents of the described examples and embodiments and are to be included within the scope of the following claims.

What is claimed is:

1. A system comprising:
    a plurality of portable signal emitting modules configured to be positionable on, and subsequently removable from, a road surface and useable when so positioned to emit visual signals, each of said signal-emitting modules comprising a battery, a radiofrequency apparatus, control circuitry and at least one visual emitter which emits said visual signals; and
    a Global Positioning System (GPS) device configured to transmit information indicating the location of one, a few, or all of said plurality of modules on a GPS display or other mapping system from one or more of said plurality of signal emitting modules to vehicles equipped to receive and display the information on a Global Positioning System (GPS) display or other mapping device within the vehicle;
    wherein the signaling modules are configured to function as a mesh network whereby control circuitry of each signaling module i) receives radiofrequency signals from one or more others of said signaling modules and ii) uses the received radiofrequency signals to synchronize its emission of visual signals with that of the other signaling modules of the system.

2. A system according to claim 1 wherein the system includes at least one Global Positioning System (GPS) transmitter.

3. A system according to claim 2 in combination with a Global Positioning System (GPS) receiver device positionable in said vehicle, the receiver device configured to receive said signals and to display a map upon which the location of at least one of said signal transmitting modules is indicated on the basis of the received location signals.

4. A system according to claim 1 wherein said visual signal emitter of each module comprises a light emitter.

5. A system according to claim 4 wherein the control circuitry is programmed such that, when said modules are positioned in an array, the modules will undergo array-specific radiofrequency communication with one another and the control circuitry will cause the visual signal emitters of the modules to emit visual signals in sequence from a first-positioned module to a last-positioned module, without radiofrequency crosstalk with modules of another array.

6. A system according to claim 5 wherein the modules function as a mesh network whereby each of said modules uses radiofrequency signals received from one or more others of said modules to self-determine its positional order or location relative to the other modules of the system and to self-adapt to a) changes in said positional order of the modules, b) elimination of one or more of the modules, c) failure of one or more of the modules and d) addition of one or more modules, to thereby maintain the emitting of said array-specific signals in sequence from a first positioned module of array to a last-positioned module of each array.

7. A system according to claim 5 wherein the radiofrequency communication between the modules is wireless.

8. A system according to claim 4 wherein said visible warning signals comprise flashes or periods of light.

9. A system according to claim 4 wherein the visible warning signals are configured to be visible from one vantage point but not visible from another vantage point.

10. A system according to claim 9 wherein the visible warning signals are visible to occupants of vehicles traveling on in a first direction on a roadway but not visible to occupants of vehicles traveling in a second direction on said roadway.

11. A system according to claim 9 wherein the modules comprise shielding apparatus or lenses which cause the visible warning signals to be visible from one vantage point but not visible from another vantage point.

12. A system according to claim 1 wherein the control circuitry in the modules may be programmed or reprogrammed from a smartphone, laptop computer, tablet computer or other portable device.

13. A system according to claim 1 wherein the control circuitry is configured to allow some of the modules to be grouped in an intra-array subset and to thereafter cause said at least one emitter of each module that has been grouped in the intra-array subset to emit signals that are simultaneous or otherwise different from signals emitted by other modules that are not grouped within that intra-array subset.

14. A method for using a system according to claim 1, said method comprising the steps of:
    positioning said plurality of signaling modules on a road surface;
    activating the system to a) cause the signaling modules to function as a mesh network whereby control circuitry of each signaling module i) receives radiofrequency signals from one or more others of said signaling modules and ii) uses the received radiofrequency signals to synchronize its emission of visual signals with that of the other signaling modules of the system and b) cause the Global Positioning System (GPS) device to transmit said information to a vehicle such that the information is displayed a Global Positioning System (GPS) display or other mapping device within the vehicle; and, thereafter, deactivating the system and removing said plurality of signaling modules from the road surface.

\* \* \* \* \*